April 28, 1936. A. G. DAWSON Re. 19,946
PARTITION
Original Filed June 24, 1927 3 Sheets-Sheet 1
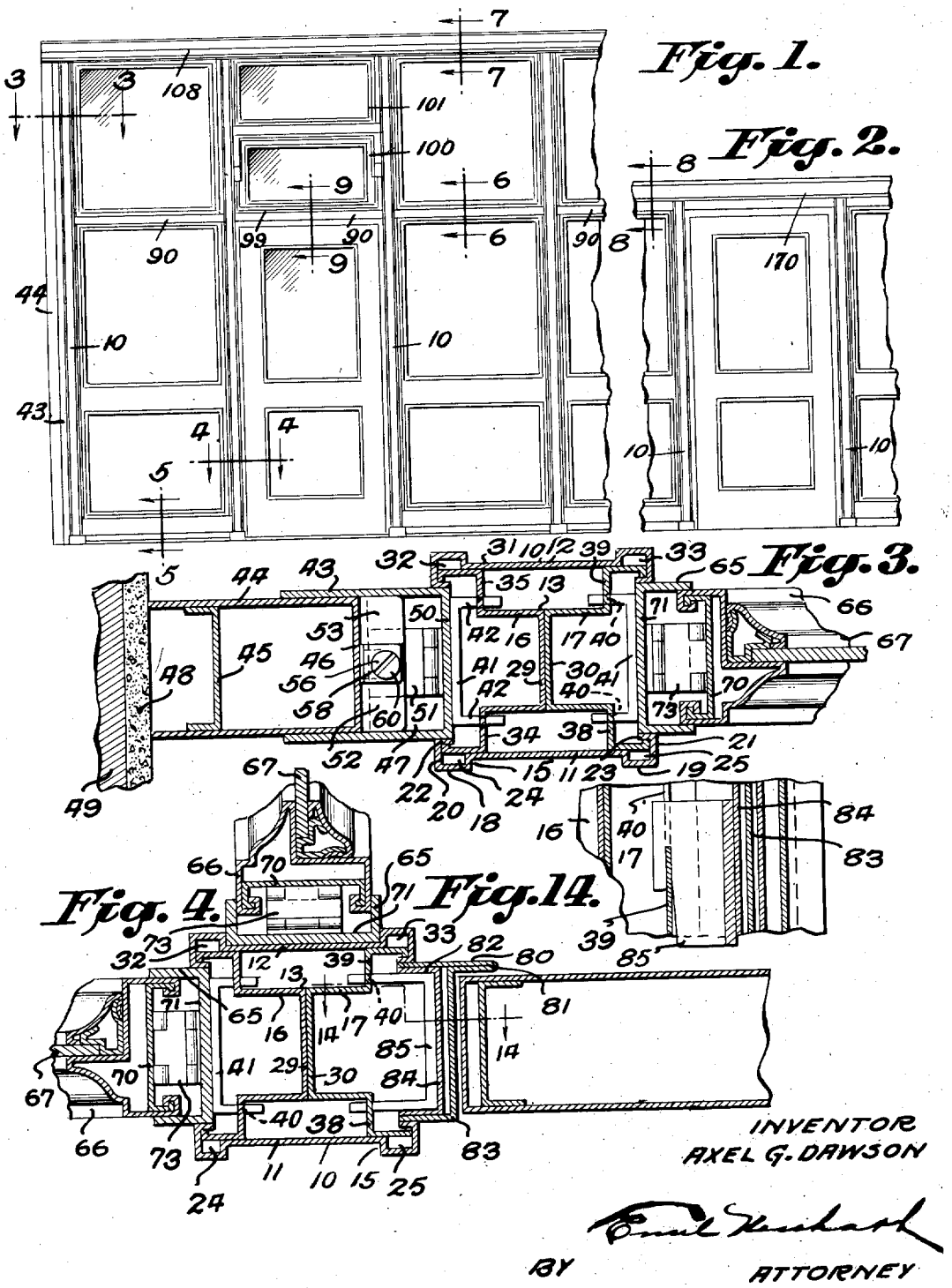
INVENTOR
AXEL G. DAWSON
BY Emil Neuhard
ATTORNEY April 28, 1936. A. G. DAWSON Re. 19,946
PARTITION
Original Filed June 24, 1927 3 Sheets-Sheet 2
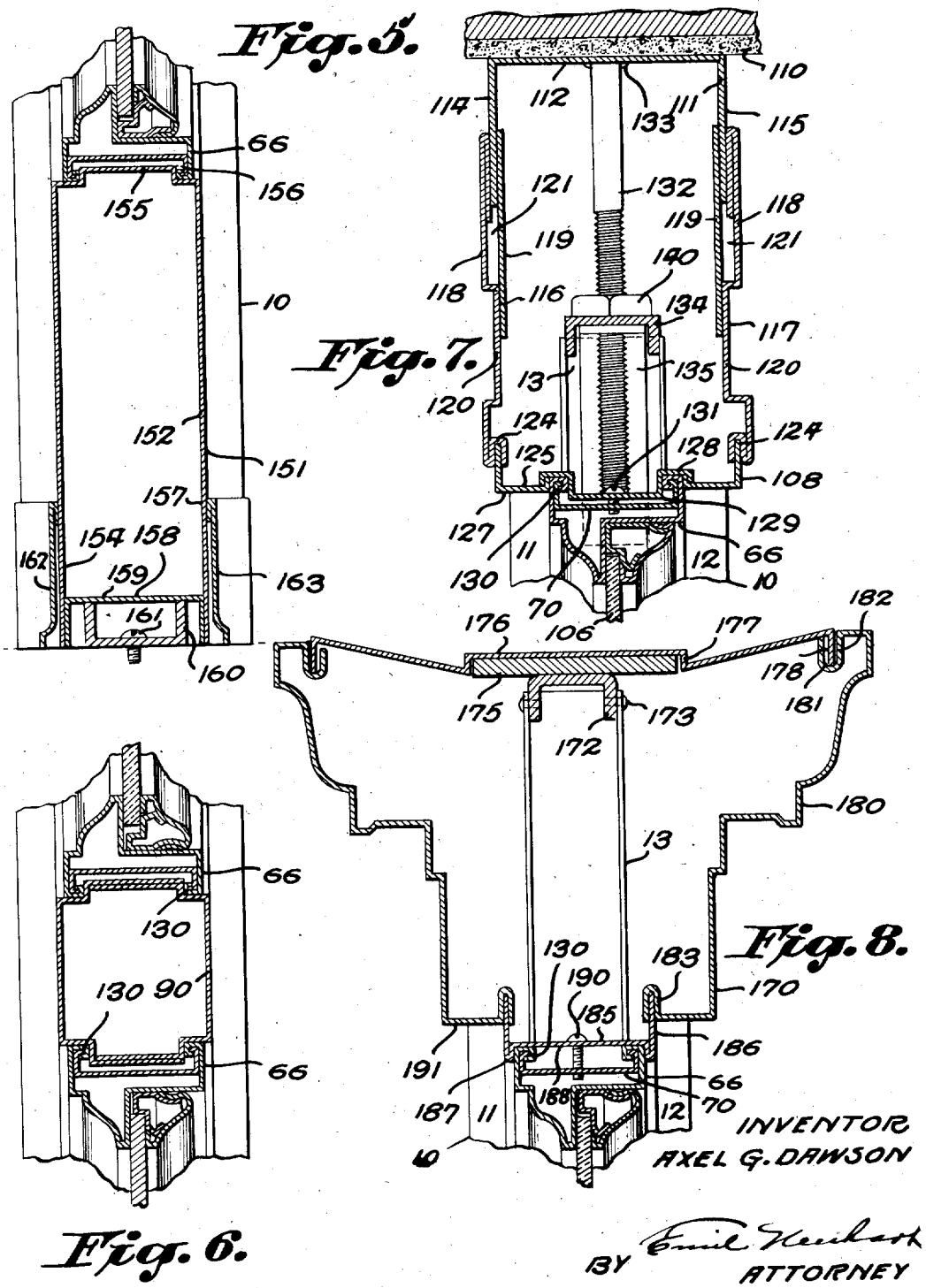

April 28, 1936. A. G. DAWSON Re. 19,946

PARTITION

Original Filed June 24, 1927 3 Sheets-Sheet 3

INVENTOR
AXEL G. DAWSON

BY Emil Kuehnert
ATTORNEY

Reissued Apr. 28, 1936

Re. 19,946

UNITED STATES PATENT OFFICE 19,946

PARTITION

Axel G. Dawson, Jamestown, N. Y., assignor to Dahlstrom Metallic Door Company, Jamestown, N. Y., a corporation of New York Original No. 1,716,624, dated June 11, 1929, Serial No. 201,096, June 24, 1927. Application for reissue June 11, 1931, Serial No. 543,726

16 Claims. (Cl. 189—34)

This invention relates to an improvement in partitions, and more particularly to the construction and assembly thereof.

It has long been necessary to divide rooms and office spaces by means of partitions which extend either from the floor to the ceiling or simply to the top of the door frame. This latter class of partitions is known in the trade as 7 foot 6 partitions, and will be referred to as such throughout the following specification. There have been many kinds of partitions in use, some of which were built up as they were installed while others have been partially assembled at the factory and finally assembled on the job. There have been wooden partitions with either glass or veneered panels and metal partitions with glass or sheet metal panels in use for some time.

In all the constructions up to the present time, however, each type of partition has failed materially in several respects. 1st: The space to be partitioned off needed to be accurately determined and the partitions were therefore required to be made according to specific dimensions. Oftentimes allowances for corners, cornices, abutments or projections of some kind or another were not made and as a result when the partitions were assembled on the job it was necessary to alter them, these alterations entailing considerable time and expense and were not satisfactory. 2nd: Supports of various kinds were necessary to position the partitions, these supports being permanently secured to the floor, walls in some instances the ceiling, and it followed that in the event it became necessary to move the partitions, the walls and floors, uncovered by such removal, were unsightly and needed special and clever work to cover up the blemishes. 3rd: When the partitions were assembled with solid panels and it was desired to remove the panels for any reason and substitute a glass panel, or if a door was located at one side of the partition and it was desired to locate it at some other place the partition would, of necessity, have to be torn down at least partially in order to make these changes. The construction disclosed in the following specification eliminates and overcomes all these difficulties and hence is a great improvement over any partition construction or assembly at the present time.

One object of this invention is to provide a partition construction which, due to its adaptability, will accurately fit within a given space, even though there has been a slight error in determining this space.

Another object of this invention is to provide a partition construction which is so arranged with relation to panels, transoms and doors that these parts may be removed and interchanged without disturbing or tearing down the remainder of the partition.

A further object of this invention is to provide a partition construction which is secured solely along the floor and yet is entirely rigid and more than strong enough for the use to which it is put.

A still further object of this invention is to provide a partition construction which is adapted to receive subsequently other partitions extending at right angles thereto without altering or in any way modifying the partition already positioned.

Other objects of this invention will appear from a consideration of the following specification taken in connection with the drawings and in which Fig. 1 is a front elevation of a ceiling height partition showing a door, transom and panels of metal and glass in place.

Fig. 2 is a front elevation of a 7 foot 6 height partition showing a door and an adjacent panel of metal and glass in place.

Fig. 3 is a sectional view taken on the line 3—3, of Fig. 1 and illustrates the manner in which the end of a partition abuts a wall.

Fig. 4 is a sectional view taken on the line 4—4, of Fig. 1 and shows the manner in which panels are secured to a pilaster and also the manner of removably securing door moulding thereto.

Fig. 5 is a sectional view taken on the line 5—5, of Fig. 1 and shows the manner of securing the mop moulding and lower end of the pilaster at the floor.

Fig. 6 is a sectional view taken on the line 6—6, of Fig. 1 and shows an intermediate rail to which panels are secured above and below said rail, the lower panel indicated as of metal and the upper panel as of glass.

Fig. 7 is a sectional view taken on the line 7—7 of Fig. 1 and shows the manner of securing the adjustable cornice and filler at the ceiling.

Fig. 8 is a sectional view taken on the line 8—8, of Fig. 2 and shows the method of reinforcing and enclosing the upper edge of a 7 foot 6 partition.

Fig. 14 is a fragmentary vertical sectional view taken substantially on the line 14—14, of Fig. 4.

Inasmuch as this invention comprises many parts, some of which are identical in construction, such duplicate parts will not be described in detail but will merely bear corresponding reference numerals.

Figure 11:
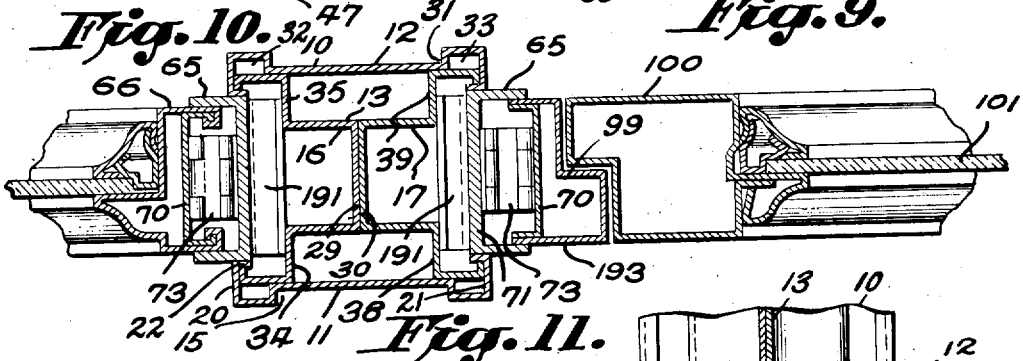
Fig. 11 is a transverse sectional view of a pilaster, panel and transom and shows a modification of the means for securing panels and frame to said pilaster.

Referring to the drawings and particularly to Figs. 3, 4 and 11, the reference numeral 10 represents a pilaster which comprises two oppositely faced members 11 and 12 held in a fixed position relative to each other by means of a reinforcing member 13. The member 11 is centrally and vertically indented at 15 and the side edges 18 and 19 are bent inwardly at right angles thereto forming flanges 20 and 21. The edges of the flanges 20 and 21 are again bent inwardly forming short flanges 22 and 23. Pockets 24 and 25 are thus formed by the edges 18 and flanges 20 and 22 and the edges 19 and flanges 21 and 23, respectively. The member 12 being a duplicate of the member 11 also has an indented portion 31 and pockets 32 and 33.

The reinforcing member 13 comprises two abutting channular elements 16 and 17, permanently secured to each other along their abutting faces 29 and 30 by welding or other suitable means. The element 16 comprises a channular shaped portion, the base of which is the face 29 and the walls of which terminate in double flanged portions 34 and 35. The edge of the portion 34 is adapted to fit within the pocket 24 of the member 11 and likewise the edge of the portion 35 is adapted to fit within the pocket 32 of the member 12. The element 17 being a duplicate of the element 16 terminates in similar double flanged portions 38 and 39, the portion 38 fitting within the pocket 25 of the member 11 and the portion 39 fitting within the pocket 33 of the member 12. It may be seen that by positioning and securing the walls 11 and 12 by means of the reinforcing member 13, a substantial pilaster or post is formed.

Vertical slots 40 are cut into each of the flanges 34 and 35 of the element 16 and also into each of the flanges 38 and 39 of the element 17, said slots being adapted to receive and interlock with combined keepers and spacer members 41. These combined keepers and spacer members 41, as is clearly illustrated in Figs. 3 and 4, are U-shaped members, the cover edges of the side walls 42 of which are vertically notched to engage or hook onto the flanges 34 and 35 of the element 16 through the slots 40 and the flanges 38 and 39 of the element 17 through the slots therein. Keepers 41 are secured along the base to a channel member 43 of such dimensions that it will fit between the flanges which form the pockets 24 and 32. Keepers are also secured along the base of a channel member 65 which is of such dimensions that it will fit between the flanges which form the pockets 25 and 33. Within the channel member 43 and in laterally adjustable relation therewith is a hollow filler 44 reinforced by brackets 45. The filler 44 is closed at one end by the wall 46, said wall, when in position of use, being within the pocket 47 in the channel member 43. The opposite end of the member 44, across which the brackets 45 extend, is open and when in use abuts the plaster 48 secured to a wall 49 (see Fig. 3).

Figure 10:
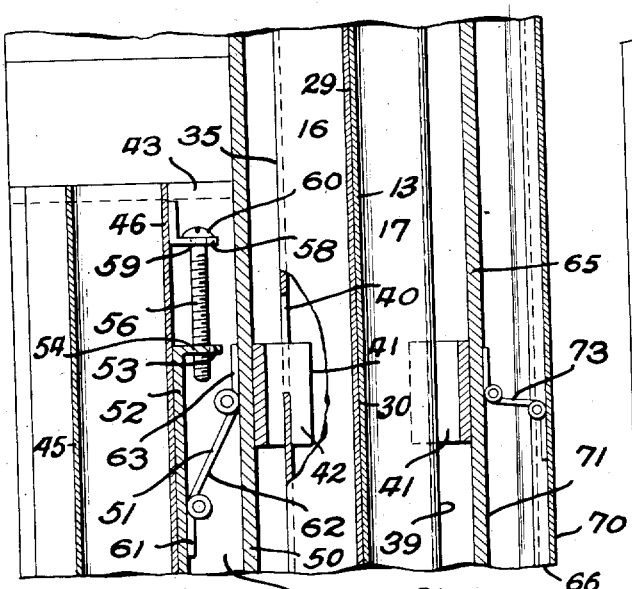
Fig. 10 is a fragmentary longitudinal sectional view of a pilaster and an adjustable wall member illustrating the means for altering and fixing the spaced relation of said member to said pilaster.

Within the pocket 47 between the walls 46 of the filler 44 and the wall 50 of the channel member 43 adjustable take-up members 51 are located which operatively control all lateral adjustment of the filler 44 with relation to the channel member 43. In Figs. 3 and 10 a take-up member 51 is shown operably secured between the wall 50 of the channel member 43 and a plate 52. The plate 52 extends longitudinally of the pocket 47 and is adapted at all times to rest against the wall 46 of the filler 44. The plate 52 extends to within a short space of the top and bottom of the partition construction and is flanged inwardly at its upper and lower ends, only the upper flange 53 being shown. Through the upper flange 53 is a threaded opening 54 with which a screw 56 meshes. Secured to the wall 46 above the upper flange 53 is an angle bracket 58, said bracket having through its horizontal portion an opening 59 in vertical alignment with the opening 54 of the flange 53. The screw 56 is adapted to extend through the opening 59 and threadably engage the flange 53 by means of the opening 54. The head 60 of the screw 56 at all times rests against the upper face of the horizontal portion of the bracket 58. Particular attention is called to the fact that the bracket 58 is rigidly secured to the wall 46 but that the plate 52 merely abuts the wall 46 and is free to be raised or lowered with relation thereto.

As stated above, the takeup members 51 are positioned within the pocket 47 and each comprises three elements 61, 62, and 63. The element 61 is rigidly secured to the plate 52, the element 63 is likewise secured to the wall 50 of the channel member 43, and the element 62 hingedly joins the other two elements. Inasmuch as the wall 46 and bracket 58 are only capable of lateral movement while the plate 52 is capable of vertical as well as lateral movement, any turning of the screw 56 in a clockwise direction will tend to move the plate upwardly toward the bracket 58. However, the plate is secured to the wall 50 by means of the takeup members 51 and can therefore not move upward in a directly vertical manner but must move outwardly and upwardly at the same time, the direction of travel being defined by the arc through which the elements 62 of the takeup members 50 travel. Since the plate 52 must travel laterally and upwardly, any such movement thereof will force the wall 46 in a directly lateral direction as the plate 52 and wall 46 are in slidable engagement with each other. It is therefore evident that by turning the screw 56 in a direction to move the plate 52 upwardly, said plate will move outwardly, forcing with it the wall 46 and bracket 58, the flanges 53 remaining in vertical alignment with said bracket. Since the hollow filler 44 includes the wall 46, said filler will be moved laterally until it abuts the plaster 48 of the wall 49. It may be seen that the more the screw 56 is turned, the greater the pressure exerted by the plate 52 against the wall 46 will be, and it is by means of this pressure imparted to the filler member 44, that it sealingly abuts the plastered wall so firmly that further securing means between the plaster 48 and the filler member 44 is unnecessary. The screw 56 not only functions to change the relative position between the filler 44 and the member 43 but also acts to lock it in such changed position. The above described adjustable filler member is very necessary to partition construction, since it is very difficult to move a pilaster once it is in place. There consequently should be some means of adjustably bridging the gap between the filler 44 when it is first set up and the plaster 48 and this is accomplished in the manner stated without the usual work involved when other makes of partitions are installed.

The construction of the partition from the wall to the first pilaster having been described, the panel construction between pilasters will now be taken up. Referring again to Fig. 3 it will be noted that the wall 11 is identical with the wall 12 and the side to which the filler 44, or filler member as it may be termed, is secured is identical to the opposite side thereof and it is to this side opposite from the filler member that attention is now directed. Between the innermost flanges of the pockets 25 and 33 in the pilaster is positioned the channel member 65 hereinbefore referred to, which bears against the U-shaped keepers 41 engaged or hooked onto the flanges 38 and 39. Within the channel member 65 and in slidable engagement with the side walls thereof is a frame 66, having a panel 67 rigidly mounted therein. Between the inner wall 70 of the frame 66 and the wall 71 of the member 65 is located a takeup member 73. This takeup member comprises three elements similar to the member 51 but is of smaller size and therefore limited to a small adjustment. One extreme element is rigidly secured to the wall 71 and the other extreme element is secured to the wall 70. It may be seen that the frame 66 by means of the take-up member 73, is in adjustable relation to the wall 71 of the channel member 65. When lateral pressure is brought to bear upon the frame 66 in a direction toward the pilaster 10, the member 73 will collapse into the recess of the member 65 and bring the frame 66 into closer proximity with the wall 71. The details of construction of the frame 66 will not be enumerated inasmuch as any frame may be adapted to this construction, provided it has a wall similar to the wall 70 of said frame and also that it will slidably enter the recess of the channel member 65. The other vertical wall of the frame 66 need not be discussed inasmuch as it is identical in construction with that portion of the frame just described and is also adapted to engage the next adjoining pilaster by means of a channel member and keeper (see Fig. 4).

Referring to Fig. 1 it will be observed that the description thus far has included the wall of a building, a filler member, a pilaster and a panel up to the pilaster which is adjacent a door; and it is to be particularly noted that the filler member is exceedingly narrow and consequently gives the completed partition a symmetrical and finished appearance from end to end with the end pilasters closely positioned to the walls. The effect of such a partition on the eye is, when viewed from any point between the ends of the partition and any distance away from it, that the structure was made to exact measurement so as to accurately fit the space between the two walls it was placed. This is clearly indicated in Fig. 1, wherein the filler members are shown as occupying only a very small fraction of the spaces occupied by the adjacent panel portions of the partition, and wherein the end pilasters serve to provide the finish to the ends of the partition so appealing to the eye and invariably demanded by the purchaser; although not previously obtainable unless the partition was constructed to exact measurements so as to exactly fit between two spaced walls. Moreover, the comparatively narrow filler members at one side of and beyond the end pilasters which project outwardly beyond the surface of the filler member and the comparatively wide panel portions of the partition, are practically concealed by such end pilasters when viewing the end portions of the partition from any intermediate point, and consequently a variation of several inches between the main body portion of the partition and the space between walls can be taken care of by the filler members without destroying the effect which the end pilasters are to have as finishing members. The door and transom construction with relation to the pilaster and also two intermediate rails will now be described. The pilaster 10 as illustrated in Fig. 4 shows a panel and frame construction on two sides thereof and a door jamb construction on the third. The side of the pilaster to which the door jamb is adapted to be positioned is identical in construction with the side of said pilaster in which is positioned the frame 66 above described. The door jamb 80 comprises two channular members 81 and 82, the member 82 fitting within the member 81. The base walls 83 and 84 of the members 81 and 82, respectively, are separated to permit the necessary door hardware (not shown) to be secured thereto. Positioned within the channel member 82 and in fixed relation therewith are one or more combined keepers and spacers 85 which are substantially identical in construction with the keepers 41, differing therefrom merely in the length of the legs. These keepers are adapted to removably engage the flanges 38 and 39 of the member 13 in exactly the same way as do the keepers 41. By referring to Fig. 14 a clear understanding of the function of said keepers may be had. Since the door jamb 80 is subject to considerable vibration and, in cases where there is no sill, is not supported at the bottom, the keepers are welded or otherwise rigidly secured to the jamb, or more particularly, the channel member 82 of the jamb.

The pilaster 10 is shown in Fig. 4 as positioning and securing panel frame constructions on two adjacent sides thereof and the door jamb construction on the third. The two adjacent sides of the pilaster while somewhat variant in construction are adapted to receive identical frames. Hence since the depths of the recesses, in the adjoining sides of the pilaster, are unlike, the keepers 41 are used to make said recesses uniform whereby the channel member 65 enters the pilaster the same depth in either recess. In other words, the channel member 65 is adapted to engage any one of the four sides of the pilaster in exactly the same manner, on the sides 11 and 12 without the use of the keepers 41 and on the remaining two sides by means of said keepers.

Figure 9:
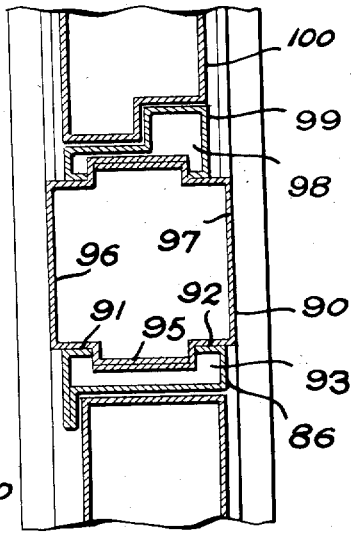
Fig. 9 is a sectional view taken on the line 9—9, of Fig. 1 and shows an intermediate rail with the upper portion of a door moulding secured below and the lower portion of the transom secured above the rail.

The lintel or lintel portion 86 of the door jamb 80 across the top of the door is somewhat similar in construction to the side of said jamb above described and as shown in Fig. 9 is adapted to be secured to a rail 90 in the following manner. The door lintel 86 rests on the jambs 80 and is open on its upper side, terminating at its edges in flanges 91 and 92 extending inwardly a short distance, whereby the width of said open side is restricted. A pocket 93 is thereby formed in which is positioned the rail 90 by means of an extended center portion 95 thereof. The portion 95 is made up of overlapping ends of each of the walls 96 and 97, said walls being held in juxtaposition because of their position within the pocket 93 and a similar pocket above. The upper portion of the rail 90 is constructed identically with the lower portion and is adapted to fit within a pocket 98 of a transom frame member 99 in exactly the same manner as it fits within the lintel 86. The transom 100 being of the usual construction will not be herein described nor will the small glass panel 101 shown in Fig. 1 be discussed in detail, since it is constructed similarly to the other panels previously described with the exception that it is smaller.

Fig. 7 shows a sectional view of the upper portion of the frame member 66 with a glass panel 106 secured therein in place of the metal panel 67 and the means of positioning said frame along its upper edge. The frame 66 is adapted to engage an adjustable cornice and filler 108 which bridges the space between the upper face of the frame 66 and the ceiling 110 and which comprises the following parts. The cornice 108 has an upper channular element 111, the base 112 of which abuts the ceiling and the walls 114 and 115 are engaged by removable side plates 116 and 117. Each of the plates 116 comprises two parts 118 and 119, the part 119 being secured along its lower edge to the middle and indented portion 120 of the part 118. The parts 118 and 119 form, when thus secured, a wall having an upwardly opening pocket 121 into which the wall 114 may extend. The lower edge of the part 118 is flanged to form a lower pocket 124, the use of which will later be described. The plate 117 also comprises parts 118, 119 which provide an upwardly opening pocket 121 to receive the wall 115 and a lower pocket 124.

Resting upon the upper end of each pilaster and extending the full horizontal length of the partition is a base member 125. This member comprises doubled flanged side portions 127 which rest upon the members 11, 12 and are locked together by central portions 128, said central portions being between the pilasters and having downwardly extending flanges which engage and retain inner and upturned flanges of the portions 127. The portion 128 is centrally depressed at 129 and when joined to the flanged portions 127, longitudinal channels are formed on each side of said depressed portion, the outside walls of each of said longitudinal channels being formed by the inner flanges of the portions 127. The edges of the frame 66 terminate in separated feet 130, the feet of the edge at the cornice and filler 108 entering the longitudinal channels therein. A screw 131 secures the centrally indented portion 129 to the wall 70 of the frame. The side portions 127 of the base member 125 terminate on their outer sides in upturned walls which are adapted to enter the pockets 124 formed in the bottom of each of the side plates 116 and 117 and act to removably secure these plates in place.

Enclosed within the cornice 108 are expansion bolts 132, one of these bolts being located above each pilaster and being the sole means of securing the partition with relation to the ceiling. The upper end of the bolt 132 has small projections 133 which frictionally engage the wall 112 of the channular element 111. Each bolt extends downwardly through a horizontal channel bar 134 and a double flanged guide bracket 135. The channel bar 134 extends substantially the full length of the partition and rests directly upon the reinforcing members 13 of the pilasters 10. The walls 11 and 12 of the pilasters 10 terminate at the base 125 of the adjustable cornice and filler 108 as do the flanged portions 34, 35, 38 and 39 of the reinforcing members 13. The remainder of the members 13, however, continue upwardly to a position well within the space within the cornice and filler and it is upon the members 13 that the channel bar 134 is positioned in fixed relation thereto by means of slots cut into the side walls of said channel member. These slots which are engaged by the bases 29 and 30 of the members 13 are cut substantially only half the depth of the side walls. The bracket 135 is secured to the base of one of the elements 16 or 17 of the reinforcing member 13 and acts merely to guide and retain the bolt 132 from buckling when pressure is brought to bear upon it by means of a nut 140.

It may readily be seen from the construction shown in Fig. 7 that when the pilasters are in an upright position and rigidly held a definite distance apart by means of the slots in the channel bar 134 with the bolt 132 extending through said bar, by turning the nut 140 the bolt will be forced upwardly and the head thereof will force the base 112 firmly against the ceiling 110 and hold it in such position. The bolt not only supports the base 112 but obviously each bolt exerts a downward pressure through the nut 145 and the channel bar 134 upon the reinforcing members 13 of the pilaster, thereby firmly and rigidly positioning the pilaster at its base. The plates 116 and 117 are removable with relation to the rest of the cornice 108 in order that the above described means for securing the partitions may be readily reached in the event the partition must be removed or altered in any way and to permit the base 112 to move toward or away from the member 125 without impairing the appearance of the cornice 108.

Attention is now directed to Fig. 5 wherein is shown the method of securing a bottom rail 151 between the floor and lower panel. The rail 151 comprises a hollow member 152, closed on its upper side and formed into a centrally located longitudinal ledge 155 which is adapted to be engaged by and fit within the recess 156 provided at the lower edge of the frame member 66 in the manner previously described. Inasmuch as the frames 66 for all panels are constructed in identically the same way, further mention thereof will not be necessary. The lower or under side of the member 152 terminates in walls 154 and 157 which abut the floor and are rigidly spaced apart from each other by means of a flanged reinforcing member 158 secured therebetween. The location of the member 158 within the hollow member 152 is determined by its flanges, which are adapted to abut the floor similarly to and between the walls 154 and 157 of said hollow member. The horizontal portion 159 thereof rests upon a channel bar 160. Mop mouldings 162 and 163 abut the floor exteriorly of the hollow member 152 for the purpose of attractively concealing the base of the member 152, or any discrepancy between an uneven floor and said member.

Figure 13:
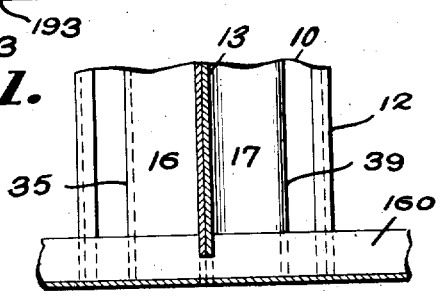
Fig. 13 is a fragmentary sectional view taken vertically through the base of a pilaster showing its engagement with the channel bar which positively determines the placing of each pilaster.

The channel bar 160 is secured to the floor by screws 161 or other suitable means and extends the length of the partition, except at the doorways where no sill is provided. The bar 160 is identical in construction to the bar 134 previously described and has similar vertical cuts at predetermined intervals extending from the upper edges of each wall downwardly to a depth substantially half the height of the walls so that either bar can be substituted for the other. The exact depth of said cuts and the manner in which they position the pilasters may be more clearly seen by referring to Fig. 13 which is a sectional view of one of the pilasters positioned on the channel bar 160. In order that the walls 11 and 12 and the elements 16 and 17 of the pilaster may abut the floor when said pilaster is positioned on the member 160, the inner faces 29 and 30 of said elements are cut away from the bottom thereof substantially equal to the cut in the walls of the bar 160. By means of this cut-away portion of the elements 16 and 17 and the vertical cut in the bar 160, the pilaster is positioned in fixed relation with the bar 160. It is obvious, if a given number of pilasters are to be used in a partition construction and the channel bars 134 and 160 have slots at uniform intervals throughout their length, that, when the bar 160 is secured to the floor the pilasters may be positioned thereon without measurement and the upper channel bar 134 positioned on the top of each pilaster, thereby insuring an absolutely parallel relation between the pilasters.

Inasmuch as some partitions are not full ceiling height but merely extend to a height which is known in the trade as "7 foot 6 height", the construction above the uppermost panel as illustrated in Fig. 2 is shown. This figure shows a front elevation of a "7 foot 6" partition and since the cornice is the only part that differs in the two constructions, with the exception that the ceiling height has one more section of panel than does the "7 foot 6", only the cornice and method of supporting or reinforcing it will be described. In Fig. 8 an enlarged sectional view of the cornice 170 is shown secured along its lower edge to the frame 66 and a pilaster 10. In the construction of this partition the reinforcing member 13 of the pilaster extends well above the tops of the walls 11 and 12 in a somewhat similar manner to that above described for the ceiling height partitions.

The member 13 being a part of the pilaster 10 must be rigidly secured at its upper end to hold said pilasters in proper alignment. This is accomplished by a channel bar 172 which is identical in construction to the channel bars 134 and 160 previously described. The member 13 is adapted to engage vertically cut slots in the bar 172 and thereby rigidly secure the pilaster at its upper end. In order that there may be no chance of the member 172 becoming dislodged from its position upon the members 13, retaining screws 173 are used to firmly join the member 172 with the members 13. Secured to the upper face of the member 172 by welding or other suitable means is a heavy strip 175 which extends the full length of the partition and is intended to give the strength and rigidity to the cornice 170 necessary inasmuch as partitions of the height have no ceiling support. Resting upon the upper face of the strip 175 is a cover plate 176 which engages the strip 175 by means of flanges 177 extending downwardly upon the side walls of said plate. Continuing from the flanges 177 the cover 176 extends substantially horizontally and terminates in vertical side flanges 178. The cornice 170 includes a filler member 180 along the upper edge of which are formed recesses or pockets 181 by means of double flanges 182. The flanges 178 of the cover plate 176 are adapted to be firmly engaged within the pockets 181 of the filler member 180. The lower edge of the filler member 180 terminates in similar double flanged portions 183 and is adapted to receive the bottom plate 185 of the cornice 170 by means of the double flanged portions 183 engaging the vertical walls 186 of the plate. The plate 185 before extending upwardly to form the walls 186 is doubled back upon itself at 187 to form a shallow channel which is adapted to receive the feet 130 of the frame 66. Inasmuch as only the weight of the cornice 170 holds it in place upon the frame 66, screws 190 through the wall 188 of the plate 185 attach the plate 185 to the wall 70 of the frame 66. The underface portions 191 of the filler member 180 are adapted to rest upon the outer walls 11 and 12 of the pilaster.

The rail 90, a section of which is shown in Fig. 9 between the upper portion of the door jam 86 and the transom, extends between all the pilasters and at the same height, as shown in Figs. 1 and 2. The rail 90 is likewise adapted to be the engaging means between two panels, as shown in Fig. 6. This rail is identical in construction to the one shown and described in Fig. 9 and is engaged by the feet 130 of the upper and lower frames 66 in substantially the same manner as the door jamb 86 engages the rail. By means of the rail 90 any number of panels may be positioned in proper relation to each other. That is, if it is desired to make use of half size panels an extra rail member may be inserted between said panels and the resulting double panel will function in the same manner as would a single panel. An illustration of this may be seen by referring to Fig. 1 wherein is shown a small panel and transom, the two together occupying the space equivalent to one regular sized panel.

Figure 12:
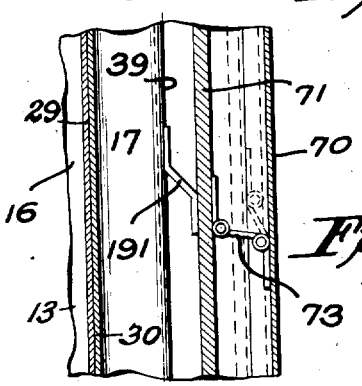
Fig. 12 is a fragmentary vertical sectional view of the modification shown in Fig. 11.

A modification of the means for securing frame members in proper relation to a pilaster previously described is shown at the left of the pilaster in Fig. 11. The pilaster 10 comprises the same parts, namely walls 11 and 12 and reinforcing member 13 but instead of positioning the channel member 65 in desired spaced relation to said reinforcing member by means of the keepers 41 secured in place by hooking them onto said member as is shown in Fig. 3, an angle bracket 191 is employed. This bracket is secured by welding or other means to the flanges 34 and 35 of the element 16 and the member 65 rests against and is positioned by the outer edge of the bracket. On the opposite side of the pilaster to the channel member 65 and brackets 191 just described are similar brackets and a channel member. In this instance, however, the channel member is adapted to engage the side wall 193 of the transom frame 99. In other words, the transom frame 99 as well as the frame 66 may be used with this modified form of positioning different frame members with relation to the pilaster. When employed adjacent a door opening the brackets 191 are rigidly secured to the door jamb 80 by welding or other means in order to prevent the jamb from shifting relatively to the pilasters which support them. By comparing Fig. 10 with Fig. 12 the difference in the two constructions may be readily understood. In Fig. 10 the keepers 41 are used to removably secure the channel member 65 associated with a frame member having a panel with respect to the pilaster and in Fig. 12 the bracket 191 is adapted to aid in positioning the frame member, but not to secure it to the pilaster. In the last-mentioned instance, the brackets simply aid in positioning channel member 65 upon the pilaster 10 but do not retain or lock it in position. It is evident that by using either construction to position frame members with relation to the pilaster a very strong and durable partition is obtained.

It will be apparent therefore that in some instances the channel members, such as 65, will be removably secured to the pilasters, while in other instances they will merely be positioned against the brackets 191. In still other instances, such as described with reference to door jambs, brackets 191 will serve as a means to position the door jamb in proper relation to the reinforcing members of a pilaster. It will therefore be understood that in some instances the brackets will serve as keepers in the same manner as the combined keepers and spacers 41. Where the brackets are merely welded or otherwise secured to a part of a pilaster and an adjacent part of a partition merely bears against the brackets, the brackets would in such cases merely serve as spacers. This is also true where the brackets are only welded or secured to a partition part intended to have its vertical marginal portions inserted into a pilaster.

In assembling partitions of this character it is only necessary to secure and level the channel bar 160 upon the floor in the direction in which the partition is to extend and upon and about this channel bar to erect the entire partition construction. The pilasters 10 are located and set down upon the channel bar 160 entering the slots cut into said bar, these slots determining the number of pilasters and their position with relation to each other. When the pilasters have been set up, the channel bar 134 (if a ceiling height partition is to be constructed) is placed upon and secured to the member 13 of each pilaster by means of similar slots. The channular element 111 is next positioned against the ceiling and retained in that position by means of the expansion bolts 132 and the nuts 140. The skeleton partition of channel bars and pilasters is now somewhat rigidly positioned and when moved to an absolute vertical position the nuts 140 are turned to firmly secure it from further movement. As previously explained, by turning the nut 140 the head of the bolt 132 is forced upwardly against the element 111 while the nut exerts pressure upon the channel member 134. By continuing the rotation of the nut 140 the skeleton partition may be so secured and braced with relation to the floor and ceiling that it will be impossible to move it out of alignment. The bottom rails 151 which extend below the panels between the pilasters are now positioned over the channel bar 160, the ends of the rails entering the recesses in the ends of the pilasters. The walls 162 and 163 which form a floor trim or mop moulding are secured to the walls of the bottom rails 151 in any suitable manner.

The lowest members of the partition now being in place, a panel may be secured thereon in the following manner. The frame 66 with the panel 67 previously secured therein is set down upon the ledge 155 of the rail 151 and simultaneously with the positioning of the lower portion of the frame on the ledge 155 the channel member 65 on one side of said frame is positioned within a pilaster and against the keepers 41, which in this instance may more particularly be referred to as spacers, although they serve to keep the channel member 65 in spaced relation to the flanged portions 36 and 39 of the channular element 17, said keepers or spacers having previously been secured to said pilaster. In order to position the opposite vertical side of the frame within the adjoining pilaster, the frame is forced laterally into the recess 75 of the member 65 so that the unsecured wall of said frame may now be inserted within the adjoining pilaster with its channel member 65 resting against the keepers or spacers 41. Inasmuch as all the frames are positioned with relation to the pilasters in identically the same way, it will not be necessary to describe their assemblage.

When the frame which extends substantially to the height of the door is in place the rail 90 is set in place upon the frame of said panel and the uppermost panel and frame may then be positioned upon said rail and secured to the pilasters in the manner just described. The door jambs 80 are first placed in the doorway opening, the keepers 85 carried by the jambs, when such are employed in preference to brackets or spacers 191, being inserted in the slots 40 as shown in Fig. 14. The lintel 86 is then placed on the jambs 80 and a rail 90 set in position. The transom and the small panel thereabove engage the rail member 90 and the pilasters in the same manner as do the panel frames so that it will not be necessary to further describe the assembling thereof.

The filler members 44 are inserted and located between the outer pilasters and the walls in the manner previously described at any time prior to the mounting of the cornice 108.

When the body of the partition is thus completed the base portion 125 of the cornice 108 is set down and over the upper edge of the frame members 66. The central portion 129 thereof is rigidly secured to the walls 70 of the frame 66 by means of screws 131 (Fig. 7). The act of drawing together the walls 70 and 129 brings pressure to bear upon the innermost flanges of the double flanged portions 127 which extend the length of the cornice and secures them rigidly in place upon the pilaster members 11 and 12. The plates 117 and 118 of the cornice 108 may now be positioned by first slidably engaging them with the walls 114 and 115 of the channular element 111 and then allowed to slide somewhat out of engagement with the walls 114 and 115 in order that the lower flanged portions 124 may engage the upturned flanges of the portions 127. When the walls 117 and 118 are in place the cornice 108 is completely assembled and not only forms an attractive joinder between the partition and the ceiling but acts to completely enclose the ends of each pilaster and the expansion bolts.

In assembling the 7 foot 6 partition construction, the positioning of the partition is carried on in identically the same way up to a height equal to that of the top of a door, the channel bar 172 being substituted for the bar 134 across the top of the pilaster, the slots therein engaging the reinforcing members 13. A plate 185 is placed upon the upper feet 130 of each frame 66 between the pilasters and is secured by screws 190 to the wall 70 of the frame 66.

The strip 175 is secured to the upper face of the channel bar 172, as stated, and the channel bar 172, with the strip 175 thereon, is secured by screws 173 to the members 13 of the pilasters in order to prevent any bulging of the channel bar away from the reinforcing members 13. The filler members 180 of the cornice 170 are now positioned upon the walls 186 of the plate 185 by means of the doubled flanged portions 183. These walls extend upwardly and since they terminate in double flanged portions 182 are adapted to receive the flanges 178 of the cover plate 176 which is placed upon the strip 175. In this way the 7 foot 6 height partition is assembled, rigidly reinforced along its upper portion and such reinforcing is entirely enclosed and concealed from view.

When the partition has been completely assembled and it is desired to make any changes in the arrangement of the sections the cornice, or at least the portions of the cornice above the section or sections in which the change is to be made, are removed. The upper panel frame is raised sufficiently to disengage it from the rail 90 and then shifted laterally to compress the takeup member on one side, thus freeing the other side from its pilaster so that the frame can be removed. The rail 90 is next removed if necessary and then the lower frame is raised, shifted laterally and removed. The same procedure is followed in a door section with the exception that the door lintel 86 is first removed and then the jambs 80 are raised enough to free the keepers 85 from the slots 40.

I consider it within the scope of my invention as set out in the appended claims that the brackets 191 shown in Figs. 10 and 11 may be welded both to the pilaster and to the channel member 65 or some other partition part, such as a door jamb, and in such instances they still would serve as a means for spacing such partition parts with respect to the reinforcing members of a pilaster. When so employed the door jamb or other partition part would only be removable with the pilasters since they would be rigidly connected thereto by the brackets. The application to and removal from the so secured partition part of panel frames and doors, transoms, or the like, would however not be effected by this change.

While only two embodiments of this invention have been shown and described, it is evident that other modifications and adaptations may be made without departing from the spirit and scope of this invention as set forth in the following claims.

Having thus described my invention, what I claim is:

1. A removable partition for buildings, comprising a bar which extends along the floor in the direction of the partition, pilasters, means on said bar for positioning said pilasters, a second bar supported by said pilasters at the upper ends thereof, means on said second bar for further positioning said pilasters, a cornice resting upon said pilasters, removable frames mounted in the sections of said partition determined by said pilasters and removable filler members between the outer pilasters and the wall for adjustably filling the spaces thus provided.

2. A removable partition for buildings, comprising a channel bar extending along the floor in the direction of the partition, said bar having suitable spaced slots therein, pilasters, each including a reinforcing member, the lower ends of said reinforcing member entering the slots in said bar, and a second channel bar having slots therein corresponding to the slots in said first named bar into which slots the upper ends of said reinforcing member enter whereby said pilasters are positioned in parallel.

3. A removable partition for buildings, comprising a channel bar extending along the floor in the direction of the partition, said bar having suitable spaced slots therein, pilasters, each including a reinforcing member, the lower ends of said reinforcing member entering the slots in said bar, removable frames mounted between said pilasters, and takeup members interposed between said frames and pilasters to hold said frames in place.

4. In a removable partition for buildings, a pilaster spaced from the wall, and means for filling said space comprising a channel member positioned by said pilaster, a filler in the channel of said member and a takeup member between said channel member and said filler for shifting said filler relatively to said channel member and causing said filler to abut said wall.

5. In a removable partition for buildings, a pilaster spaced from the wall, and means for filling said space comprising a channel member positioned by said pilaster, a filler in the channel of said member, a takeup member secured to said channel member, and a screw connecting said takeup member to said filler, said screw, when turned in direction causing said takeup member to shift said filler relatively to said channel member.

6. In a removable partition for buildings, a pilaster spaced from the wall and means for filling said space comprising a channel member, keepers between said channel member and said pilaster, a filler in the channel of said member, a takeup member in said channel secured to said channel member, and means carried by said filler for raising said takeup member and causing said filler to advance against the wall and close the space between the pilaster and wall.

7. In a removable partition for buildings, a pilaster spaced from the wall and means for filling said space comprising a channel member, keepers between said channel member and said pilaster, a filler in the channel of said member, a takeup member in said channel comprising three hingedly joined elements, one of the end elements being fixed to said channel member, a plate to which the other end element is secured, and means carried by said filler for raising and lowering said plate.

8. In a removable partition for buildings, a pilaster spaced from the wall and means for filling said space comprising a channel member, keepers between said channel member and said pilaster, a filler in the channel of said member, a takeup member in said channel comprising three hingedly joined elements, one of the end elements being fixed to said channel member, a plate to which the other end element is secured whereby the intermediate element connects said plate and channel member so that when said plate is raised or lowered it will also travel laterally, and means carried by said filler for raising and lowering said plate.

9. In a removable partition for buildings, pilasters, and a cornice comprising a channular element resting against the ceiling, a base member supported upon said pilasters and plates removably interlocked with said channular element and base member.

10. A pilaster, comprising faced members and a reinforcing member consisting of two abutting channular elements permanently secured together along their abutting faces, said elements terminating in double flanged portions with which said faced members are slidably interlocked.

11. In a removable partition for buildings, pilasters, each including a reinforcing member, a channel bar engaging each of said pilaster reinforcing members, a cornice comprising a channular element resting against the ceiling, a base portion supported from said pilasters, face plates removably interlocked with said channular element and said base portion, an expansion bolt and nut structure mounted upon said channel bar and in engagement with said channular element whereby when said nut is reciprocated, said bolt will cause said channular element to engage the ceiling.

12. In a removable partition for buildings, a pilaster having slots therein, a door jamb comprising telescoped channular members separated adjacent their base walls, keepers secured to and extending outwardly from said door jamb and adapted to engage said pilaster slots whereby said jamb is removably secured to said pilaster.

13. In a removable partition for buildings including end pilasters spaced from two spaced walls of a building, a member embraced by at least one of said pilasters, a second member co-operating with said first-mentioned member and constituting a filler element, said members being relatively telescopic, and adjustable means to cause telescopic movement of said members relatively to properly fill the space between said pilaster and said wall and hold one of said members in firm contact with said wall, said pilasters serving as vertical end finish members for said partition and said members serving to occupy any surplus space between said partition and at least one of said two spaced walls.

14. In a removable partition for buildings, a main partition wall of fixed dimensions, at least one edge of which is spaced from a wall of the building, a filler partition portion occupying the space between said edge and said wall and comprising two telescopic members, one of which is in space-closing relation with said main partition portion and the other of which is in firm contact with said wall, and means between said telescopic members for causing them to move relatively.

15. A removable partition for buildings, comprising a main partition portion of fixed dimensions having one marginal portion in spaced relation to a wall of the building, said marginal portion and wall serving as contacts, an adjustable filler partition portion occupying the space between said marginal portion and said wall and comprising two parts, one of which receives bearing from one of said contacts and the other of which is movable relative to the other contact to assure a proper closure of the space between said contacts, and means between opposing faces of the two parts of said filler partition portion adjustable to various positions to cause relative movement of said parts.

16. A partition, comprising a section of definite size and shape having a vertical end pilaster spaced from a fixed portion of a building, a member embraced by said pilaster between the same and said fixed portion of the building, a second member co-operating with said first-mentioned member and constituting a filler element, said two members being relatively movable to occupy any existing space between said section and said fixed portion of the building and hold one of said members in firm contact with said fixed portion of the building, said pilaster being adapted to serve as a vertical end finish member for said section and said relatively movable members serving to occupy any surplus space between said pilaster and said fixed portion of the building, and means for causing relative movement of said two members to reduce or increase the combined exposed width of said two members.

AXEL G. DAWSON.